United States Patent Office 3,529,288
Patented Sept. 15, 1970

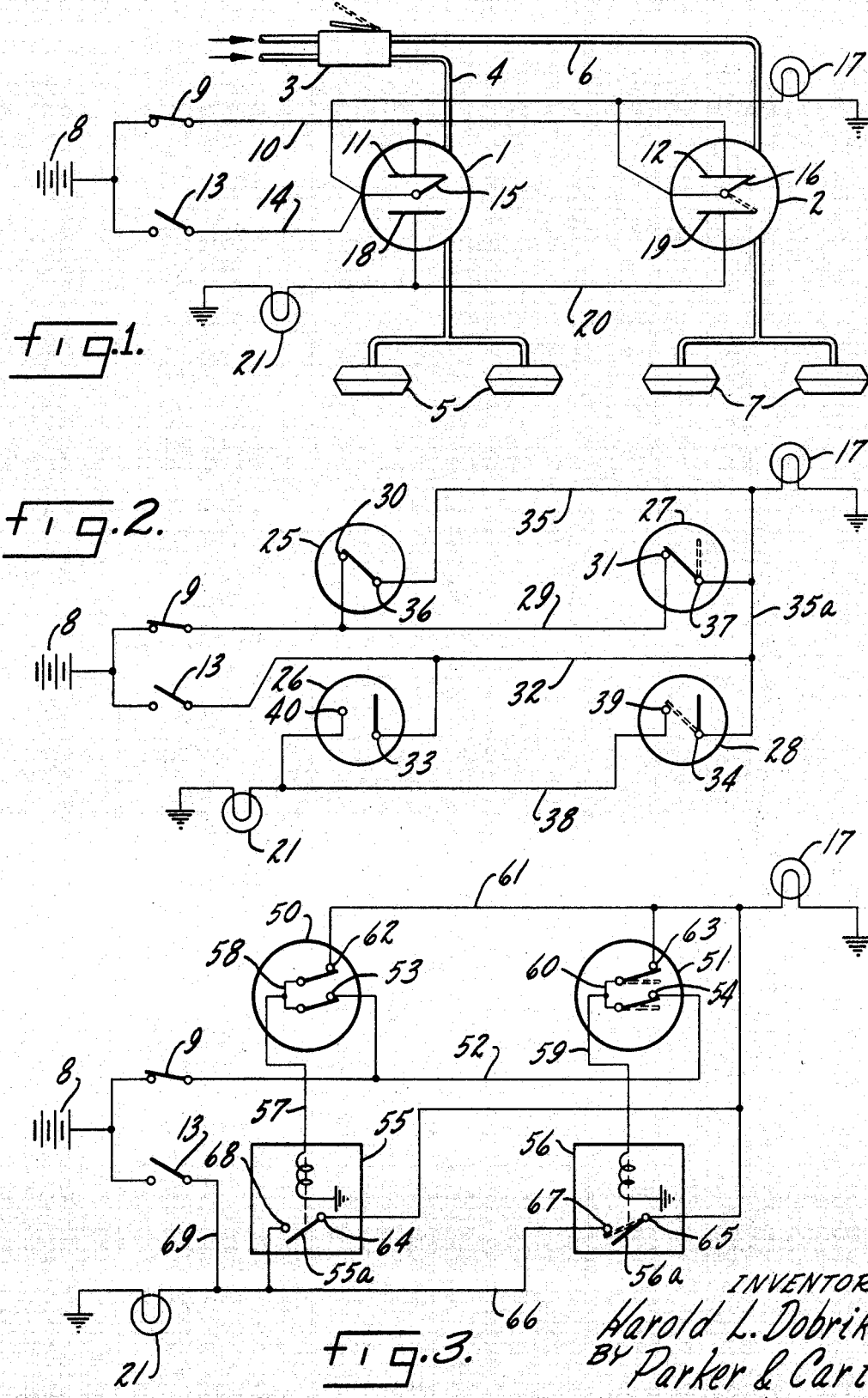

3,529,288
BRAKE SYSTEM SAFETY INDICATOR
Harold L. Dobrikin, Highland Park, Ill., assignor to Berg Mfg. & Sales Co., Des Plaines, Ill., a corporation of Illinois
Filed Jan. 10, 1967, Ser. No. 608,389
Int. Cl. B60g 1/00, 1/44
U.S. Cl. 340—60          2 Claims

ABSTRACT OF THE DISCLOSURE

An electrical assembly including interrelated normal and warning circuits and independent switches, each switch independently responsive to pressure in an associated part of a vehicle air brake system to complete a normal electrical circuit and each responsive to loss of pressure in its associated part of said system to complete a warning circuit. The vehicle stop light, ignition and starter switches are included in the assembly.

---

This invention relates to vehicle brake systems and has particular relation to vehicles having a split or dual fluid pressure brake system.

Such dual brake pressure systems divide the brake pressure into separate systems, each including a different set of brake-actuating cylinders. Thus, if leakage or loss of fluid pressure occurs in one portion of such dual system, it remains possible to stop the vehicle by employment of the other brake system portion to actuate the brake cylinders with which the later is in communicaion. Since, under some circumstances, the operator may succeed in adequately stopping the vehicle by employment of but one-half the brake cylinders under circumstances continuing for some time, the operator may continue unaware that one portion of the brake system is inoperative.

Accordingly, it is one purpose of the present invention to provide means automatically indicating to the vehicle operator the failure of one portion of a dual brake system.

Another purpose is to provide a warning system having automatic means for pretesting the same.

Another purpose is to provide an indicating system incorporating a vehicle starter switch.

Another purpose is to provide an indicating system incorporating an ignition switch.

Another purpose is to provide an indicating system incorporating a vehicle stoplight.

Another purpose is to provide a normal circuit and a warning device circuit for dual pressure brake systems, including independent switches each effective to energize the warning device circuit in response to loss or diminution of pressure in its portion of said dual system and each effective to energize the normal circuit in response to normal pressure in its portion of said dual system.

Another purpose is to provide a normal circuit and a warning device circuit for dual pressure brake systems, including independent switches each effective to energize the warning device circuit in response to loss of pressure in its portion of said dual system and each effective to energize the normal circuit in response to pressure in its portion of said dual system and including the stoplight and the starter and ignition switches of the vehicle.

Other purposes will appear from time to time during the course of the specification and claims.

The invention is illustrated more or less diagrammatically in the accompanying drawings, wherein:

FIG. 1 is a schematic view of one form of the assembly of the invention;

FIG. 2 is a schematitc view of another form of the assembly of the invention; and FIG. 3 is a schematic view of still another form of the assembly of the invention.

Like parts are indicated by like numerals throughout the specification and drawings.

Referring now to the drawings, and particularly to FIG. 1, the numeral 1 generally designates a single-pole, double-throw, pressure-responsive switch. The internal structure of the switch 1 may take a variety of forms, a suitable such switch being illustrated, for example, in U.S. Letters Patent 2,928,913, issued Mar. 15, 1960, and entitled "Double Throw Switch." Indicated at 2 is a second single-pole, double-throw pressure-responsive switch corresponding to the switch 1.

Indicated at 3 is a brake application valve. An air pressure conduit 4 extends from the valve 3 to the switch 1 and from the switch 1 to the brake actuating cylinders 5. A second conduit 6 extends from brake application valve 3 to the switch 2 and from the switch 2 to a second set of brake actuating cylinders 7.

A source of electrical energy 8 is connected to one side of an ignition switch 9, the other side of which is connected, by suitable electrical conductor 10, to a terminal 11 of switch 1 and to a terminal 12 of switch 2. The source 8 is also connected to one side of a starter switch 13, the other side of which is connected by a suitable electrical conductor 14 to a switch arm 15 of switch 1 and to a switch arm 16 of switch 2. The conduit 14 is also connected to stoplight 17. A second terminal 18 of switch 1 and a second terminal 19 of switch 2 are connected by electrical conductor 20 to a warning device such as the light 21.

Referring now to FIG. 2, the parts thereof corresponding to those illustrated in FIG. 1 are provided with identical numerical designations for convenience and clarity. In the form of the invention illustrated in FIG. 2, however, the switch 1 has been replaced by a pair of switches 25, 26. The switches 25 and 26 are pressure-responsive, it being understood that both switches communicate with a conduit such as the conduit 4 illustrated in FIG. 1. Switch 25 is a single-pole, single-throw, normally-open, pressure-responsive switch, while switch 26 is a single-pole, single-throw, normally-closed, pressure-responsive switch. Similarly, switch 2 of FIG. 1 has been replaced, in FIG. 2, with switches 27, 28 which, it will be understood, are in communication with a pressure conduit such as that shown at 6 in FIG. 1. Switch 27, like switch 25, is a single-pole, single-throw, normally-open, pressure-responsive switch and switch 28, like switch 26, is a single-pole, single-throw, normally-closed, pressure-responsive switch. A conductor 29 connects the ignition switch 9 with the terminals 30, 31 of switches 25, 27, respectively. A conductor 32 connects starter switch 13 with the terminals 33, 34 of switches 26, 28, respectively. A conductor 35 connects the terminals 36, 37 of switches 25, 27, respectively, with stoplight 17 and, through branch conductor 35a, with conductor 32. A conductor 38 connects terminals 39, 40 of switches 28, 26, respectively, with warning light 21.

Referring now to FIG. 3, wherein parts corresponding to those described above are provided with identical numerals for clarity, the numerals 50 and 51 designate double-pole, single-throw, normally-open, pressure-responsive switches. It will be understood that switch 50 communicates with a pressure conduit such as that shown at 4 in FIG. 1 and switch 51 communicates with a pressure conduit such as that shown at 6 in FIG. 1. A conductor 52 connects switch 9 with a terminal 53 of switch 50 and with a terminal 54 of switch 51. Indicated at 55 and 56 are single-pole, single-throw relays having normally closed contacts 55a, 56a, the relay 55 being connected by conductor 57 with a switch arm 58 of switch 50 and the relay 56 being connected by conductor 59 with a switch arm 60 of switch 51. A conductor 61 connects terminal 62 and 63 of switches 50, 51, respectively, with the stoplight 17 and with terminals 64, 65 of relays 55, 56, respectively. A conductor 66 connects terminals 67 and 68 of relays 56, 55, respectively, with warning light 21 and a branch conductor 69 connects starter switch 13 with conductor 66 and thus with light 21.

Whereas there has been shown and described an operative form of the invention, it should be understood that this showing and description are to be taken in an illustrative or diagrammatic sense only. For example, while a warning light is referred to, it will be understood that the warning device may take the form of an audio signal, flag or the like without departing from the nature and scope of the invention. There are many modifications in and to the invention which will be apparent to those skilled in the art and which will fall within the scope and spirit of the invention.

The use and operation of the invention are as follows:

When the operator actuates the starter switch 13 to start the vehicle engine, there being at that point no pressure in the brake system beyond the brake application valve 3, the switch arms 15 and 16 will be in the dotted line position shown, for example, in switch 2 of FIG. 1. Hence the warning device circuit will be energized and light 21 will glow, providing an automatic test and assurance to the vehicle operator that the warning circuit and the bulb of light 21 are in working order. The stoplight 17 will also glow while the starter switch is actuated and even though valve 3 is not being operated, but this is momentary and of no consequence. As commonly known, ignition switch 9 is closed prior to or simultaneously with closure of starter switch 13. Thus electrical energy will be delivered to terminals 11 and 12 but without effect since arms 15 and 16 are out of contact with said terminals. When the vehicle engine starts, starter switch 13 is, as is well known, opened or disengaged, but ignition switch 9 will be and will remain closed throughout the period of engine operation. With switch 13 open and arms 15 and 16 in their dotted line positions, valve 3 not being actuated, no circuit is closed to indicator 21 and it remains inactive.

Upon operation of valve 3 by the vehicle operator in applying the vehicle brakes, pressure is delivered through conduits 4, 6 to switches 1, 2 and the switch arms 15, 16 take the full-line position illustrated in FIG. 1. It will be understood, of course, that the switch arms in all forms of the invention are yieldingly urged toward a first position and movable by fluid pressure to a second position. Electrical energy is thus delivered, in the assembly of FIG. 1, through conductor 10, terminal 11, switch arm 15 and conductor 14 to stoplight 17 and through terminal 12, switch arm 16 and conducotr 14 to stoplight 17, and the stoplight is illuminated to indicate the fact of brake application. With switch arms 15 and 16 in the pressure-responsive position shown in full lines in FIG. 1, no electrical energy is supplied to the warning light 21. If, however, pressure should fail, during brake application, in conduit 4 but not in conduit 6, or vice-versa, the switch arm 15 or 16 will move to the dotted line position shown in switch 2 of FIG. 1 and electrical energy will be supplied to terminal 18 or 19 and thus through conductor 20 to the warning light 21 to alert the operator to the fact that half of his dual pressure system has become ineffective. If, for example, pressure should fail in conduit 6 during a brake application, the switch arm 16 will take the dotted line position shown in FIG. 1. The switch arm 15, however, will remain in the full line position shown since pressure exists in conduit 4. Electrical energy would then be conducted from terminal 11 through arm 15, conductor 14, switch arm 16, terminal 19 and conductor 20 to illuminate the light 21 as well as to preserve the indication of brake application by illumination of stoplight 17. It will be clear that the same result occurs if pressure exists in conduit 6 and fails in conduit 4.

Referring now to FIG. 2, closure of switch 13 provides a test-illumination of light 21 through conductor 32 and normally-closed switches 26, 28, there being no pressure in conduits 4 and 6 to produce an opening of switches 26, 28. Actuation or closure of ignition switch 9 is effective to deliver electrical energy through conductor 29 to terminals 30, 31 of switches 25, 27. These switches are normally open and are moved to closed position in response to fluid pressure produced in brake conduits 4 and 6, respectively, upon actuation of application valve 3. Electrical energy is thus conducted across the terminals of switches 25, 27 to conductor 35 and to light 17. Electrical energy is also conducted, by branch conductor 35a and conductor 32, to switches 26, 28 which are normally closed switches. Since switches 26, 28 are held open in response to fluid pressure in their respective brake conduits, device 21 is not activated. Upon failure of brake pressure in the conduit 6, for example, the contacts of switch 27 will open and the contacts of switch 28 will close. Electrical energy, however, will continue to be delivered through terminals 30, 36 of switch 25 and conductor 35 to stoplight 17 and through conductors 35, 35a and 32 to terminal 34 of switch 28, since pressure remains in conduit 4 during brake application. Since the switch 28 was closed in response to diminution of pressure in conduit 6, such electrical energy will be transferred from terminal 34 to terminal 39 and through conductor 38 to warning light 21 to warn the vehicle operator of the failure of one portion of his brake system. The same is true with respect to failure of pressure in conduit 4, whereupon electrical energy would flow through switch 27 and conductor 35 to light 17 and through the conductors 35a, 32 and switch 26 to light 21.

Referring now to FIG. 3, closure of switch 13 provides test-activation of indicator 21 through conductor 69. It will be understood that fluid brake pressure present at switches 50, 51, through their communication with conduits such as those shown at 4 and 6 in FIG. 1, maintain the arms 58, 60 of said switches in closed position. Hence electrical energy, supplied through switch 9, conductor 52 and terminals 53, 54, passes, upon operation of valve 3, through terminals 62, 63 and conductor 61 to stoplight 17 and also to terminals 64, 65 of relays 55, 56, respectively. Electrical energy is also delivered through conductor 57 from arm 58 of switch 50 to relay 55 and through conductor 59 from arm 60 of switch 51 to relay 56. Failure, during brake application, of fluid pressure at switch 50, for example, opens switch 50 and deactivates relay 55. Electrical energy, however, is still conducted through switch 51 and conductor 61 to light 17 and to the terminal 64 of relay 55. The failure of electrical energy in arm 58 and conductor 57 deactivates relay 55 and results in the closing of the normally closed switch arms or contact points 55a of relay 55 to connect terminals 64, 68 thereof and thus to deliver electrical energy from conductor 61 through conductor 66 to warning light 21 to alert the vehicle operator. The same result occurs upon failure of pressure at switch 51, the electrical energy being then supplied through conductor 61 to light 17 and through conductor 61, terminal 65, contacts 56a, terminal 67 and conductor 66 to warning light 21.

I claim:

1. A vehicle brake system having first and second brake means operated independently by respective first and second fluid pressure means, a source of electrical energy, electrically operated brake indicator means to signal application of the brake means, electrical switch means including a starter switch intermittently operated for starting the vehicle motor and an ignition switch operable during running of the motor, electrically operated warning means to signal pressure below a predetermined magnitude in either of the first and second fluid pressure means; first warning switch means including a normally open switch and a normally closed switch, the switches being actuated to their closed and open positions, respectively, responsive to pressure in said first pressure means above said predetermined magnitude; second warning switch means including a normally open switch and a normally closed switch, the switches being operated to their closed and open positions, respectively, responsive to pressure in said second pressure means above said predetermined magnitude; and, conductor circuit means for electrically connecting the source of electrical energy with a contact of the ignition and starter switches, to connect the opposite contact of the ignition switch with a contact of each of the normally open switches, to connect the opposite contact of the starter switch with a contact of each normally closed switch together with the opposite contacts of the normally open switches and with the brake indicator means, to connect the opposite contacts of the normally closed switches with the warning means, and to connect the indicator means and warning means to ground.

2. A vehicle brake system having first and second brake means operated independently by first and second fluid pressure means, each pressure means including a fluid conduit directed to its associated brake means, a source of electrical energy, electrically operated brake indicator means to signal application of the brake means, electrical switch means including a starter switch for starting the vehicle motor, an ignition switch, electrically operated warning means to signal pressure below a predetermined magnitude in either of the first and second fluid pressure means; first pressure operated switch means including a pair of normally open switches, each of said switches being operated to its closed position responsive to pressure in the conduit of said first pressure means above said predetermined magnitude; second pressure operated switch means including a pair of normally open switches, each of said switches being operated to its closed position responsive to pressure in the conduit of said second pressure means above said predetermined magnitude; first and second electrically operated relay means, each relay means having a normally closed switch; and, conductor circuit means to connect the source of electrical energy with a contact of each of the ignition and starter switches, to connect the opposite contact of the starter switch with the warning means, to connect the opposite contact of the ignition switch with a contact of one normally open switch of each pressure operated switch means, to connect a contact of the other of the normally open switches of each pressure operated switch means with the brake indicator means and with a switch contact of each of the relay means, to connect the opposite contacts of the first switch means with the first relay means to open, when energized, its associated switch, to connect the opposite contacts of the second switch means with the second relay means to open, when energized, its associated switch, to connect the opposite contact of the switch of each relay means with the warning means, and to connect the indicator and warning means to ground.

References Cited

UNITED STATES PATENTS

| | | |
|---|---|---|
| 2,332,301 | 10/1943 | Cox. |
| 2,847,258 | 8/1958 | Burdick. |
| 2,871,066 | 1/1959 | Pannier et al. |
| 3,194,608 | 7/1965 | Rich. |
| 3,423,727 | 1/1969 | Adamson _____ 340—52 |

ALVIN H. WARING, Primary Examiner

K. N. LEIMER, Assistant Examiner

U.S. Cl. X.R.

340—71